BENZISOTHIAZOLONES

Oskar Bub, Ludwigshafen (Rhine), Germany, assignor to Knoll A.G., Ludwigshafen (Rhine), Germany
No Drawing. Filed July 23, 1962, Ser. No. 211,850
Claims priority, application Germany, July 25, 1961,
K 44,329; Feb. 22, 1962, K 45,967
8 Claims. (Cl. 260—247.1)

This invention relates to basically substituted benzisothiazolones of the formula

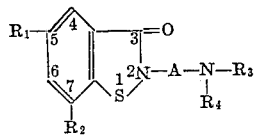

wherein A represents a lower alkylene of 2 to 4 carbon atoms, $R_1$ and $R_2$ are hydrogen or halogen, $R_3$ and $R_4$ represent hydrogen, lower alkyl, cycloalkyl, hydroxyalkyl of 2 to 4 carbon atoms or alkoxyalkyl of 2 to 4 carbon atoms, and $R_3$ and $R_4$ together with the nitrogen atom on which they are substituted stand for an unsubstituted or lower alkyl-substituted heterocyclic ring having from 5 to 6 atoms in the ring, e.g., piperidino, pyrrolidino, morpholino or piperazino rings.

It also relates to the physiologically tolerable salts of such compounds, to compositions and tablets containing such compounds and salts, and to a method of administering such compounds and salts.

The compounds of the invention possess distinct antiphlogistic properties and are useful for the therapy of inflammatory processes. Thus, for example, they show good antiphlogistic efficacy in treating lumbago, arthritis, arthroses deformans, thrombophlebitis, erythema nodosum or erythema exsudativum multiforme.

A number of methods are available for synthesis of the new compounds.

They are obtainable reacting 2-halogenthiobenzoyl-halides of the formula

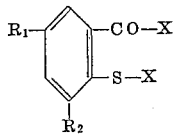

wherein X and Y represent halogen atoms, with diamines of the formula

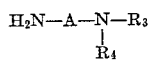

if desired in the presence of halogen hydracid binding agents. 2-halogenthio-benzoyl-halides of the above formula are obtainable by action of excess halgen on a solution of diphenyldisulphide-dicarbonic acid-(2,2′)-dichloride. It is unnecessary to isolate the 2-halogenthio-benzoyl-halide so obtained. After expelling the excess halogen by concentrating the solution under reduced pressure, the intermediate benzoyl halide may be reacted directly with a diamine of the above formula while cooling, the basic component preferably being applied in excess. Instead of an excess of diamine, it is also possible to use other halogen hydracid binding agents.

Another method for the preparation of the new basically substituted benzisothiazolones involves cyclising 2-halogenthio-benzamides of the formula

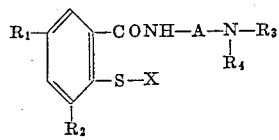

at elevated temperatures and/or by means of alkaline agents. 2-halogenthio-benzamides of the above formula are obtainable by reaction of diphenyldisulfide-dicarbonic acid-(2,2′)-dichloride with diamines of the formula

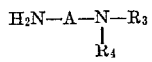

and splitting of the disulfide bridge with elementary halogen. Cyclisation of the intermediate so obtained can be accomplished by application of elevated temperature or alkaline agents or by a suitable combination of both.

Further, the new compounds may be prepared by disproportionating diphenyl disulfides of the formula

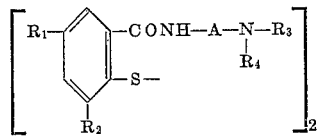

by treatment with alkaline agents, whereby half of the starting material is transformed into basically substituted thiosalicylamides. Suitable alkaline agents are for instance 2 N sodium hydroxide or other squeous alkaline lyes.

Furthermore, the new compounds are obtainable by reacting benzoylene disulfides of the formula

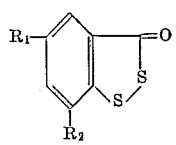

with diamines of the formula

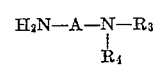

at elevated temperature. The reaction takes place preferably in an alcoholic solution at the boiling point of the solvent.

Further, it is also possible to obtain the new compounds by reacting benzisothiazolones of the formula

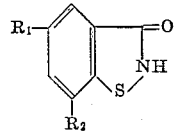

preferably in the form of their alkaline salts or in the presence of halogen hydracid binding agents with reactive esters of amino-alcohols of the general formula

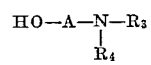

Suitable reactive esters of amino-alcohols of the above formula are for instance aminoalkyl halides or aminoalkyl toluene-sulfonic acid esters.

In this reaction, besides the desired end product, there are formed at first ethers of the benzisothiazolone which are substituted by

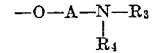

in the 3-position. The two isomers can be separated by distillation or fractionated crystallisation of salts. The alkylation reaction may be carried out according to known methods per se by reacting reactive metal salts of benzisothiazolone with aminoalkyl halides or by reacting free benzisothiazolones with the basic component in the presence of halogen hydracid binding agents.

The compounds are also obtainable by reacting reactive esters of alcohols of the formula

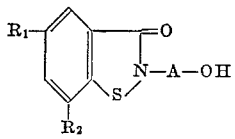

with amines of the general formula

if desired in the presence of halogen hydracid binding agents, and by alkylating products of the invention with primary or secondary amino group, if desired subsequently in known manner.

A special method of carrying out the process involves reacting reactive esters of alcohols of the above formula firstly with an alkaline phthalimide, thereafter splitting the substituted phthalimide thus formed of the general formula

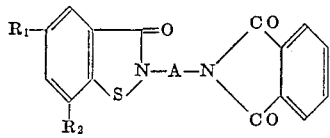

in known manner with hydrazine or concentrated acids to the corresponding primary amino compound, and finally alkylating the latter in known manner.

The reactive esters of alcohols of the general formula

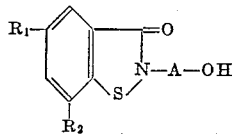

used as starting material are obtainable by reacting 2-halogenthio-benzoyl halides with aminoalkanols and thereafter forming esters, for instance with thionyl chloride or p-toluene sulfochloride. They also may be obtained by reacting, in a corresponding manner, compounds wherein the amino group of the formula

is substituted by a hydroxyl group.

The reaction of the reactive esters with the amines takes place at elevated temperature, preferably but not necessarily in an inert organic solvent, for instance an aromatic hydrocarbon such as benzene, toluene or xylene, or in an alcohol or ether. With low-boiling amines, the reaction can be carried out in a closed vessel under pressure. An extra mol of the amine used is preferably employed as halogen hydracid binding agent; however other halogen hydracid binding agents may be also used, for instance alkali carbonates, alkaline earth carbonates, or tertiary amines such as pyridine, dimethylaniline and chinoline. A larger excess of primary amine and liquid ammonia is suitably used for the reaction in order to reduce formation of undesired higher alkylated amines.

For the preparation of benzisothiazolones with a primary amino group the use of alkaline phthalimide is especially recommended because the reaction of the reactive esters with liquid ammonia is relatively unsatisfactory due to the formation of secondary and tertiary amines.

A subsequent alkylation of compounds with primary or secondary amino groups may be carried out in known manner per se, for instance with alkylation agents or by reductive alkylation. Quaternary ammonium compounds are preferably formed by reacting the reaction products with quaternisation agents such as dialkyl sulfate or alkyl halide.

Among the various compounds within the scope of this invention that are preferred are those in which A is ethylene or propylene, $R_1$ and $R_2$ are hydrogen or chlorine, $R_3$ is hydrogen, lower alkyl, lower hydroxyalkyl, lower methoxyalkyl or cyclohexyl, $R_4$ is hydrogen or lower alkyl, and in which $R_3$ and $R_4$ together with the nitrogen on which they are substituted are piperidino, pyrrolidino, morpholino, piperazino or lower alkyl piperazino groups. Best results thus far have been obtained with 2(gamma-dimethylaminopropyl) - benzisothiazolone, 2($\beta$-N'-methylpiperazinoethyl)-benzisothiazolone, 2 - ($\beta$ - cyclohexylaminoethyl) - benzisothiazolone, 2(gamma - pyrrolidinopropyl)-benzisothiazolone, 2(gamma-allylaminopropyl)-benzisothiazolone, 2($\beta$-morpholinoethyl) - benzisothiazolone, and 2-($\beta$-diethylaminoethyl)-benzisothiazolone.

The physiologically tolerable salts thereof that are preferred are those conventionally used, in therapeutic applications, particularly the salts of organic acids, especially the maleates, citrates, oxalates, and the salts of inorganic acids, particularly the hydrochlorides and methiodides.

The application of the new compounds of the invention in the therapy is preferably carried out by peroral administration. However, it is also possible to accomplish administration by subcutaneous (hypodermic) injection. The smallest single effective dosage unit contains about 50 mg. of benzisothiazolone, e.g., in a tablet or (sugar-coated) pill. The largest single dosage unit should contain about 200 to 250 mg. of the new compound. The preferred single dose amounts to about 100 to 200 mg. of the new compounds. The preferred daily dosage is between about 500 and 700 mg. of benzisothiazolone regardless of the manner of administration. Examination has shown that the new basically substituted benzisothiazolones are tolerated without adverse reaction even when administered for an extended period of time.

The antiphlogistic effect of the compounds in the rat-foot was examined by pharmacological tests after injection of dextran, croton-oil, egg-white, formalin and serotonine. The results showed that the new products produce an impressive alteration of the swellings produced by the said substances after peroral, subcutaneous and intravenous administration to the white mouse.

Analysis of chronic toxicity in animal tests has shown that the new compounds do not cause any disadvantageous alterations of the blood-count, of the internal organs or tissue, even when they were administered for several weeks in therapeutically effective doses.

In comparison with basically substituted derivatives of benzisothiazolone-1,1-dioxide (saccharine) which have become known from the U.S. Patent 2,751,392, the new compounds have superior activity with regard to antiphlogistic properties, as shown in the following table:

|  | Toxicity $LD_{50}$ White mouse Subcut., mg./kg. | Antiphlogistic Effect ||||||||
|---|---|---|---|---|---|---|---|---|---|
|  |  | Croton Oil, mg./kg. |||| Dextran, mg./kg. ||||
|  |  | 10 | 30 | 50 | 130 | 10 | 30 | 50 | 130 |
| 2(γ-dimethylaminopropyl)-benzisothiazolone | 128 | 23 | 42 | 45 | ---- | 17 | 23 | 33 | ---- |
| 2(β-morpholinoethyl)-benzisothiazolone | 160 | 14 | 22 | 29 | ---- | 8 | 12 | 27 | ---- |
| 2(β-diethylaminoethyl)-benzisothiazolone | 138 | 21 | 39 | 48 | ---- | 17 | 30 | 43 | ---- |
| 2(β-diethylaminoethyl)-saccharine | 315 | 3 | 0.5 | −10 | 8 | −4 | 6 | 4 | 10 |
| 2(β-morpholinoethyl)-saccharine | 660 | −1 | 13 | 18 | 21 | −2 | −1 | 7 | −2 |

The test procedure and calculations of antiphlogistic efficacy employed were those of H. Haas as published in "Naunyn-Schmiedeberg's Archiv für Experimentelle Pathologie und Pharmakologie," Volume 227, Springer-Verlag (1956), page 84, as well as Haas, Hohagen, Kollmannsperger, "Vergleichende Untersuchungen mit Analgeticis," Arzneimittel-Forschung, Editio Cantor KG. (1953), pages 241 to 242. In the reported tests, the state of swelling and inflammation was induced by 0.1 ml. croton oil of 2 percent concentration or 0.1 ml. dextran of 6 percent concentration, both diluted in olive oil.

The data in the table show that minimal dosages of the compounds of the invention are effective in significantly reducing the inflammation, whereas more than twice the dosage of the saccharine compound does not yield a therapeutically useful effect.

EXAMPLE 1

*2(gamma-dimethylaminopropyl)-benzisothiazolone*

69 g. of finely pulverised diphenyldisulfide-dicarbonic acid-(2,2')-dichloride were suspended in 500 cc. of dry carbon tetrachloride and dry chlorine was introduced while stirring vigorously and cooling with water until all the dichloride had dissolved. The 2-chlorothio-benzoyl chloride thus formed may, if desired, be isolated by evaporating the solvent under reduced pressure (melting point 66–68° C.). It is simpler, however, to proceed as follows:

To eliminate excess chlorine, the solution was concentrated under reduced pressure to half the original volume and thereafter slowly added, drop by drop while stirring, to a solution of 81 g. of 3-dimethylaminopropylamine in 250 cc. of carbon tetrachloride while maintaining the temperature below 20° C. by cooling with ice-water. Thereafter stirring was continued for one hour at room temperature. The reaction mixture was extracted several times with dilute hydrochloric acid. The base was precipitated from the acid extracts by addition of dilute sodium hydroxide and taken up in ether. After drying over postassium carbonate, the solvent was distilled off and the remaining yellow oil distilled in vacuum. 80 g. of pale yellow oily base of the boiling point 157–159° C./0.2 mm. Hg were obtained. The acid maleate melts at 115–116° C. after recrystallization.

EXAMPLE 2

*5-cholor-2(β-diethylaminoethyl)-benzisothiazolone*

4,4'-dichlorodiphenyl disulfide dicarbonic acid-(2,2') dichloride in carbon tetrachloride was treated as in Example 1 with chlorine to form the corresponding benzoyl chloride, which was then reacted in the same manner with β-diethylaminoethylamine. The free 5-chloro-2 (β-diethylaminoethyl)-benzisothiazolone thus formed was dissolved in alcohol and precipitated by introduction of hydrogen chloride. The hydrochloride and a melting point at 225–227° C. after recrystallization from ethanol.

The hydrochloride of 5-chloro-2(gamma-dimethylaminopropyl)-benzisothiazole, having a melting point of of 224–225° C. after recrystallization from ethanol, was prepared in a similar manner by use of 3-dimethylaminopropyl amine.

EXAMPLE 3

*5,7-dichloro-2(β-diethylaminoethyl)-benzisothiazolone*

4,4',6,6'-tetrachlorodiphenyl disulfide dicarbonic acid-(2,2')-dichloride in carbon tetrachloride was treated as in Example 1 with chlorine to form the corresponding benzoyl chloride, which was then reacted in the same manner with β-diethylaminoethylamine. The free 5,7-dichloro - 2(β - diethylaminoethyl) - benzisothiazole was dissolved in ether, precipitated by introduction of hydrogen chloride and recrystallized from isopropanol. The hydrochloride melted at 180 to 181° C.

EXAMPLE 4

*2(β-diethylaminoethyl)-benzisothiazolone*

25 g. of diphenyldisulfide-dicarbonic acid-(2,2')-bis-β-diethylamino-ethylamide were suspended in 150 cc. of carbon tetrachloride and 4.5 cc. of bromine in 30 cc. of carbon tetrachloride were added dropwise while stirring vigorously. The yellow bromthio-compound was exhausted by suction, washed with carbon tetrachloride, suspended in 100 cc. of glacial acetic acid and heated to boiling under reflux until the whole was dissolved. After cooling, the mixture was poured into water, rendered alkaline with sodium hydroxide and the precipitated oil was taken up in ether. The ethereal solution was dried with potassium carbonate, concentrated and the hydrochloride was precipitated by introducing hydrogen chloride. This hydrochloride melts at 179–180° C. after recrystallization from alcohol.

Diphenyldisulfide-dicarbonic acid-(2,2')-bis-β-diethylamino-ethylamide (M.P. 135–136° C. from benzene) was prepared by reaction of diphenyldisulfide-dicarbonic acid-(2,2')-dichloride with diethylamino-ethylamine.

EXAMPLE 5

*2(β-diethylaminoethyl)-benzisothiazolone*

25 g. of diphenyldisulfide-dicarbonic acid(2,2')-bis-β-diethylaminoethylamide were heated with 125 cc. of 2 N sodium hydroxide for one hour on the water bath while stirring. After cooling, the separated oil was taken up in ether, the ethereal solution was dried with potassium carbonate, concentrated and the hydrochloride was precipitated by introducing hydrogen-chloride. Melting point: 179–180° C. after recrystalization from alcohol.

EXAMPLE 6

*2(β-diethylaminoethyl)-benzisothiazolone*

8.4 g. of benzoylene disulfide were heated to boiling under reflux for four hours with 6 g. of diethylaminoethylamine in 50 cc. of alcohol. To eliminate the hydrogen sulfide that was formed, a moderate current of nitrogen was passed through. The solution was poured into water, the separated oil was extracted with ether and, after drying the solution over potassium carbonate, the hydrochloride was precipitated by introducing hydrogen chloride. Melting point 179–180° C. after recrystallization from alcohol.

EXAMPLE 7

*2(β-diethylaminoethyl)-benzisothiazolone*

18 g. of benzisothiazolone-sodium were heated for one hour to 60° C. with 16 g. of diethylamino ethylchloride in 100 cc. of dimethyl formamide. The reaction mixture was poured into water, the separated oil was extracted with ether, the ethereal solution was washed several times with water and dried over potassium carbonate. After concentrating the solution, the hydrochloride was precipitated by addition of alcoholic hydrochloric acid. On boiling out with acetone, principally only the hydrochloride of the O-ether dissolved whereas the hydrochloride of the N-alkylated compound remained undissolved. The hydrochloride melts at 179–180° C. after recrystallization from alcohol.

EXAMPLE 8

*2(β-cyclohexylamino-ethyl)-benzisothiazolone*

11 g. of N-(β-chloroethyl)-benzisothiazolone were heated to boiling under reflux for four hours with 20 g. of cyclohexylamine in 50 cc. of toluene. The cyclohexylamine hydrochloride was filtered off by suction and the toluene solution was then extracted several times with dilute hydrochloric acid. The base was precipitated from the aqueous acid solution by adding a 20 percent caustic soda lye and taken up in ether. The ethereal solution was dried over potassium carbonate and thereafter the solvent was distilled off. 13 g. of oily crude base were obtained which, in alcoholic solution, was converted into the hydrochloride by introducing hydrogen chloride. The hydrochloride melts at 216–218° C. after recrystallization from methanol.

EXAMPLE 9

2(β-n-butylamino-ethyl)-benzisothiazolone 17 g. of N(β-tosyloxy-ethyl)-benzisothiazolone were heated to boiling under reflux for two hours with 22 g. of n-butylamine in 100 cc. of toluene. After cooling, the toluene solution was worked up as described in Example 1. 20.5 g. of crude base were obtained. This was converted, in isopropylalcohol, into the hydrochloride by introducing hydrogen chloride. The hydrochloride melts at 168–169° C. after recrystallization from isopropylalcohol.

EXAMPLE 10

2(β-piperidino-ethyl)-benzisothiazolone 10.4 g. of N-(β-bromethyl)-benzisothiazolone were heated to boiling under reflux for five hours with 10 g. of piperidine in 50 cc. of isopropylalcohol. After cooling, the reaction mixture was poured into very dilute hydrochloric acid, small quantities of neutral materials were eliminated by extracting with ether and thereafter the base was precipitated by adding 20 percent caustic soda lye. The base was worked up as described in Example 1 and, in alcoholic solution, was converted into the hydrochloride. The hydrochloride melts at 215–216° C. after recrystallization from isopropylalcohol.

2(β-morpholinoethyl)-benzisothiazolone was prepared by use of morpholine in place of piperidine in the same procedure. The hydrochloride melts at 248–250° C. after recrystallization from methanol.

2-(β-pyrrolidinoethyl)-benzisothiazolone was prepared in the same manner by use of pyrrolidine in place of piperidine. The base melts at 87–88° C. after recrystallization from benzene.

2-[β(N'-methylpiperazino)-ethyl] - benzisothiazolone was prepared in the same manner by use of N-methylpiperazine in place of piperidine. The dihydrochloride melts at 268–269° C. after recrystallization from methanol.

EXAMPLE 11

2-(gamma-methylamino-propyl)-benzisothiazolone 23 g. of N-gamma-chloropropyl-benzisothiazolone were heated to 110° C. for twenty hours in an autoclave with a solution of 12 g. of methylamine in 100 cc. of benzene. The reaction mixture was extracted with dilute hydrochloric acid, the base was precipitated by adding excess 20 percent caustic soda lye, then taken up in ether and worked up as described in Example 1. The crude base was precipitated in the form of an oxalate in alcoholic solution by adding 12 g. of oxalic acid. After recrystallization from alcohol, 18 g. of the oxalate were obtained having a melting point at 135–136° C. The melting point of the hydrochloride after recrystallization from isopropanol was 133–134° C.

EXAMPLE 12

2-(gamma-aminopropyl)-benzisothiazolone 93 g. of N-gamma-chloropropyl-benzisothiazolone were heated to boiling under reflux for two hours with 80 g. of phthalimido potassium in 400 cc. of dimethyl formamide. After cooling, the reaction mixture was poured into water, the precipitated substance filtered off by suction, washed with water and recrystallized from alcohol. 80 g. of N-(gamma-phthalimido-propyl)-benzisothiazolone of the melting point 148–149° C. are obtained.

17 g. of this compound were heated to boiling under reflux for two hours with 3 g. of 80 percent hydrazine hydrate in 100 cc. of alcohol. Dilute hydrochloric acid was added until a clear acid reaction took place and the solution was heated to boiling under reflux for another half an hour. After filtering off the precipitated phthalic acid hydrazide by suction, the solution was concentrated in vacuum. The base was precipitated by adding excess 20 percent caustic soda lye and then extracted with ether. The etheral solution was dried over potassium carbonate and the solvent thereafter distilled off. The crude base was precipitated in alcoholic solution in the form of oxalate by adding 6 g. of oxalic acid. 7.5 g. of oxalate of the melting point 177–178° C. were obtained.

EXAMPLE 13

2-(gamma-dimethylaminopropyl)-benzisothiazolone 10.5 g. of N-gamma-aminopropyl-benzisothiazolone were heated to boiling under reflux for five hours with 10 cc. of 30 percent aqueous formaline solution and 6 cc. of formic acid in 100 cc. of alcohol. The solution was concentrated in vacuum, the base was precipitated by adding excess 20 percent caustic soda lye and worked up as described in Example 1. The crude base was distilled in vacuum at 145–150° C. at 0.2 mm. Hg and the maleate thereof was precipitated in acetone solution. The melting point of the maleate after recrystallization from acetone is 114–115° C.

EXAMPLE 14

2-(gamma-dimethylaminopropyl)-benzisothiazolone methosulfate 9.4 g. of N-(gamma-dimethylaminopropyl)-benzisothiazolone were mixed with 4 cc. of dimethylsulfate in 60 cc. of acetic ether. The reaction mixture became hot exothermically. After a little while, the quaternary salt crystallized. After standing for two hours, the salt was filtered off by suction, washed with ethyl acetate and recrystallized from alcohol. Yield: 12 g., melting point: 178–179° C.

In addition, the following compounds were prepared by analogous methods:

2-[β(3'-methoxypropylamino)-ethyl]-benzisothiazolone, hydrochloride: M.P. 126–127° C. (from isopropanol)

2-(gamma-allylamino-propyl)-benzisothiazolone:
 Oxalate—M.P. 142–143° C. (from methanol)
 Hydrochloride—M.P. 159–160° C. (from isopropanol)

2-(gamma-isobutylamino-propyl)-benzisothiazolone, hydrochloride: M.P. 194–196° C. (from ethanol)

2-(gamma-pyrrolidino-propyl)-benzisothiazolone, hydrochloride: M.P. 153–155° C. (from isopropyl alcohol)

2-[gamma-(β'-hydroxyethylamino)-propyl]-benzisothiazolone, oxalate: M.P. 163–164° C. (from methanol)

2-(gamma-dimethylaminopropyl)-benzisothiazolone, methoiodide: M.P. 191–192° C. (from alcohol)

I claim:
1. A member of the group consisting of benzisothiazolones of the formula

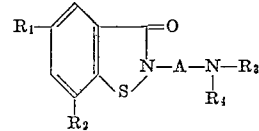

wherein A represents lower alkylene of 2 to 4 carbon atoms, $R_1$ and $R_2$ are members of the group consisting of hydrogen and halogen, $R_3$ and $R_4$ are members of the group consisting of hydrogen, lower alkyl, cyclohexyl, hydroxyalkyl of 2 to 4 carbon atoms and alkoxyalkyl of 2 to 4 carbon atoms, and $R_3$ and $R_4$ together with the nitrogen atom on which they are substituted represent a member of the group consisting of piperidino, pyrrolidino, morpholino, piperazino and lower alkyl piperazino, and the non-toxic acid addition and quaternary ammonium salts thereof.

2. 2-(gamma-dimethylaminopropyl)-benzisothiazolone.
3. 2-[β-(N'-methylpiperazino) - ethyl] - benzisothiazolone.

4. 2-(β-cyclohexylaminoethyl)-benzisothiazolone.
5. 2-(gamma-pyrrolidinopropyl)-benzisothiazolone.
6. 2-(gamma-allylaminopropyl)-benzisothiazolone.
7. 2-(β-morpholinoethyl)-benzisothiazolone.
8. 2-(β-diethylaminoethyl)-benzisothiazolone.

References Cited by the Examiner
UNITED STATES PATENTS

| | | | |
|---|---|---|---|
| 2,751,392 | 6/1956 | Grogan et al. | 260—293.4 |
| 2,870,015 | 1/1959 | Allen et al. | 260—304 |
| 2,955,073 | 10/1960 | De Beer | 167—65 |
| 2,956,055 | 10/1960 | Laubach | 260—243 |
| 2,979,504 | 4/1961 | Smith | 260—247.1 |
| 3,004,889 | 10/1961 | Kuna et al. | 167—65 |
| 3,005,821 | 10/1961 | Hayao | 260—268 |
| 3,007,934 | 11/1961 | Bencze | 260—268 |
| 3,012,039 | 12/1961 | Morley | 260—304 |

OTHER REFERENCES

Chemical Abstracts Subject Index, vol. 54: page 222s (1960).

Grogan et al., Journal of Organic Chemistry, vol. 20: pages 1425–1429 (1955).

NICHOLAS S. RIZZO, *Primary Examiner.*

IRVING MARCUS, *Examiner.*